UNITED STATES PATENT OFFICE.

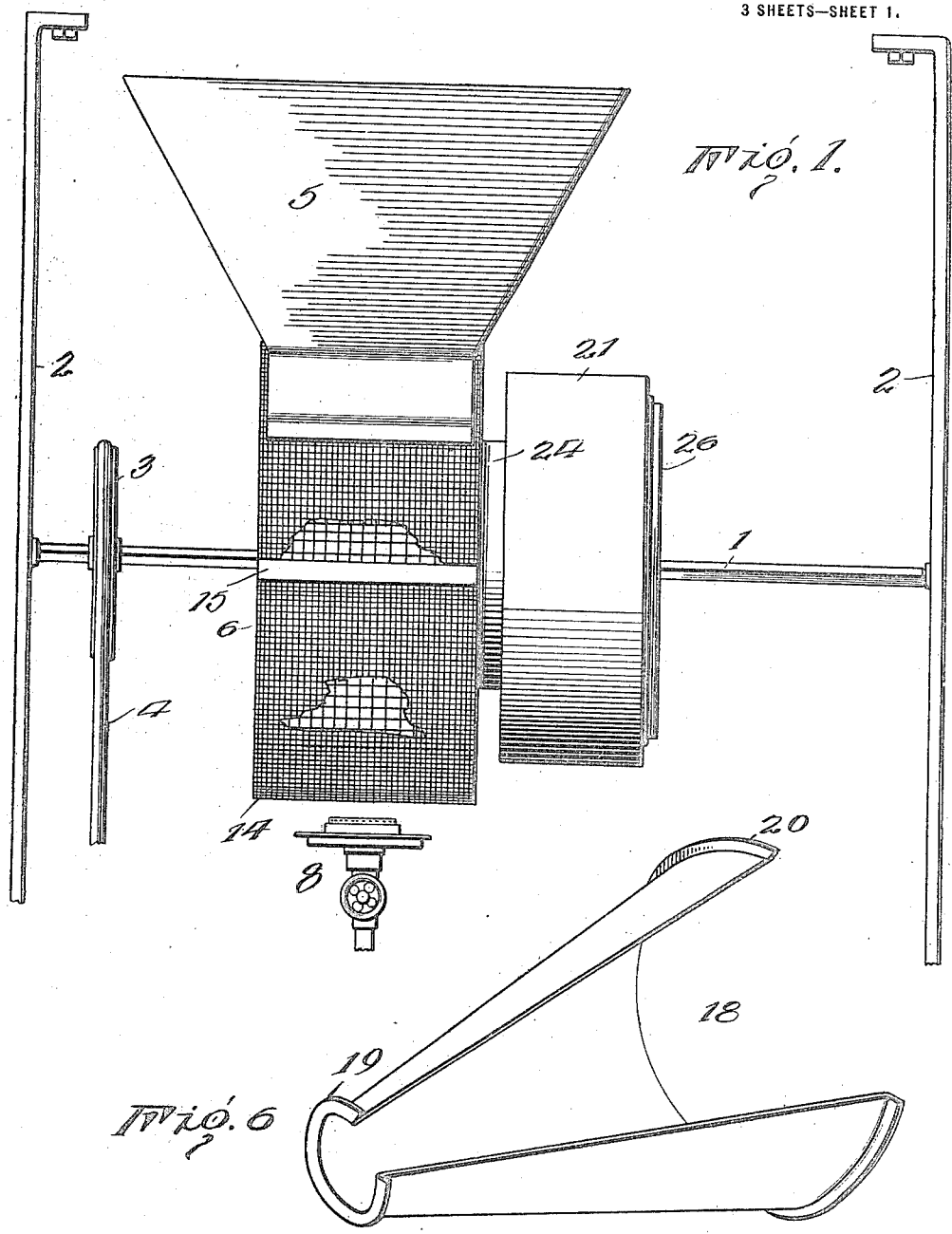

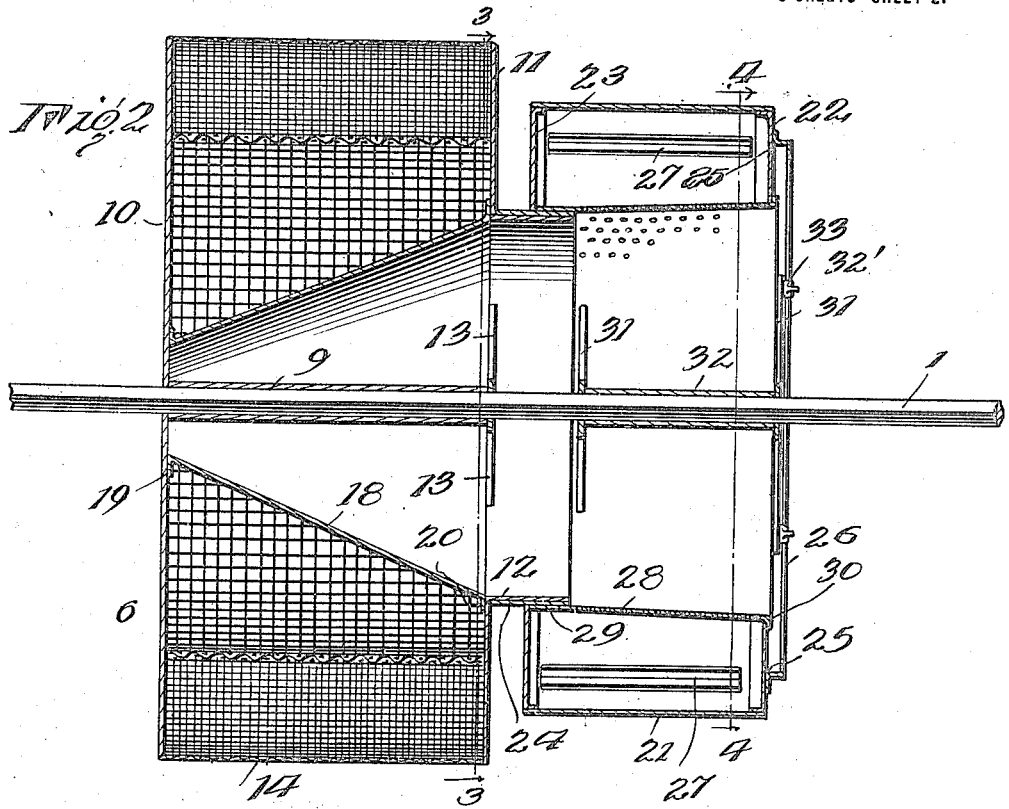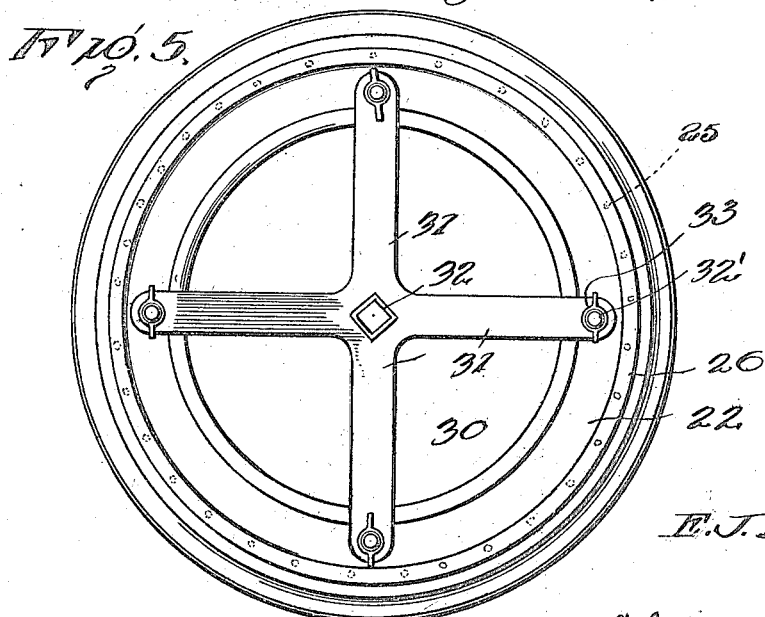

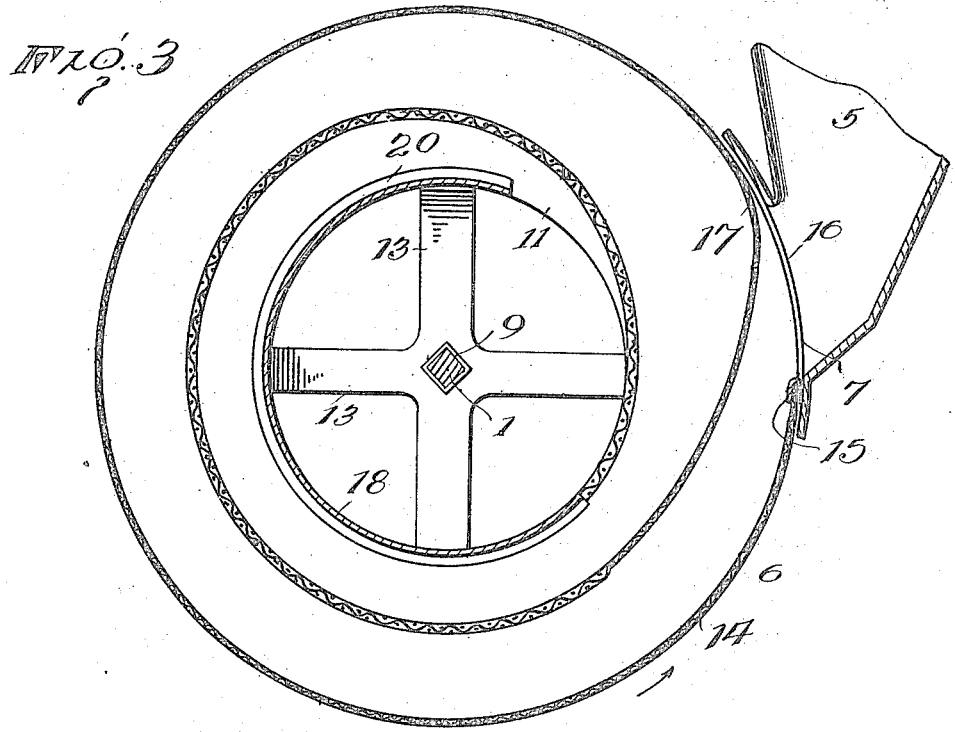
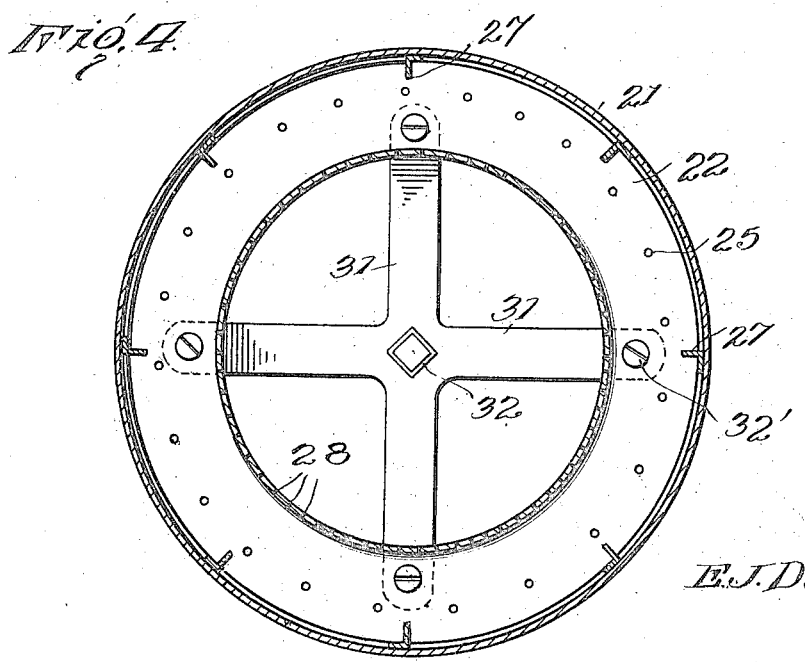

EDWARD J. DAUGHERTY, OF HUNTSVILLE, ALABAMA.

POPCORN-MACHINE.

1,248,087.  Specification of Letters Patent.  Patented Nov. 27, 1917.

Application filed December 19, 1916. Serial No. 137,828.

*To all whom it may concern:*

Be it known that I, EDWARD J. DAUGHERTY, a citizen of the United States, residing at Huntsville, in the county of Madison and State of Alabama, have invented certain new and useful Improvements in Popcorn-Machines, of which the following is a specification.

This invention relates to machines for popping corn and has for one of its objects the provision of simple, inexpensive and efficient machine by the use of which pop corn may be automatically taken from a hopper and caused to travel around and through a foraminous drum, during which travel it is subjected to the action of heat whereby it will be popped, the popped corn being automatically delivered from one end of the drum. A further object of the invention is to provide novel means whereby the popped corn may be buttered and automatically delivered in its buttered condition for sale or use. The invention seeks further to provide means whereby the popping chamber or member may be readily separated from the buttering chamber or member when it is desired to deliver the popped corn in an unbuttered condition, and a still further object of the invention is to so construct the buttering cylinder or chamber that the surplus melted butter which may drop from the buttered pop corn will be caught and returned to the buttering chamber so that it will not be lost.

The several stated objects of the invention and other incidental objects which will appear as the description of the invention proceeds are attained in such a mechanism as is illustrated in the accompanying drawings and the invention resides in certain novel features which will be hereinafter first fully described and then more particularly pointed out in the appended claims.

In the accompanying drawings:

Figure 1 is an elevation of an apparatus embodying my present improvements;

Fig. 2 is a central longitudinal section of the same;

Fig. 3 is a transverse section on the line 3—3 of Fig. 2;

Fig. 4 is a transverse section on the line 4—4 of Fig. 2;

Fig. 5 is a detail end view of the buttering drum;

Fig. 6 is a detail perspective view of the discharge member of the popping drum.

In carrying out my invention, I employ a shaft 1 which may be journaled in any convenient fixed supports, indicated at 2, and is angular in cross section. Upon this shaft, at any convenient point, is a driving-pulley 3 over which is trained a belt 4 leading from any preferred form of motor so that the shaft may be easily rotated in the operation of the apparatus. A hopper 5 is provided to contain the pop corn and this hopper may be supported in any convenient or preferred manner. The popping drum 6 is arranged to fit close to the outlet of this hopper, as shown at 7, in Fig. 3, and below the said drum is arranged a burner 8 which may be adapted to burn a hydro-carbon or any other preferred form of fuel.

The popping drum 6 consists of a hub or central sleeve 9 which is of angular cross section so that it will fit closely upon the shaft 1 and will rotate with said shaft. One end of this hub or central sleeve 9 is secured to an end plate 10 which is imperforate, except at its center so that it may fit upon the driving shaft 1, and will form a closure for the drum to prevent the escape of the popping corn therefrom. The opposite end of the drum is defined by a plate 11 which is constructed with a large central opening from which projects an annular rib or flange 12, spokes or arms 13 extending from the end of the sleeve 9 to the said rim so as to properly support the end of the drum and maintain the circular form thereof. The side or peripheral member of the drum is foraminous and is preferably formed from wire netting 14 of a sufficient size to withstand the action of the heat from the burner 8 and at the same time prevent the corn dropping through its meshes. One end of the foraminous member is reinforced by a plate 15 so that it will be sufficiently rigid to extend between the ends of the drum parallel with the shaft or axle and will not be readily bent when in use. An opening, indicated at 16, is provided in the periphery of the drum to admit the corn to the interior of the same and this opening is defined by giving the foraminous member a snail or spiral formation so that while the periphery of the drum is circular, the foraminous member is carried inward from the periphery at a point 17, spaced from the plate 15 to define the said opening 16 and then gradually approaches the axis of the drum, as shown clearly in Fig. 3. From the point where the foraminous member is equal in diameter to the outlet or discharge opening of the drum, the inner wall of the drum is imperforate and defined by a tapered or flared shell 18 which is provided with annular flanges 19 and 20 at its ends, the flange 19 at its smaller end being secured in any desired manner to the end plate 10 of the drum while the flange 20 at the larger end of said shell is secured to the end plate 11 concentric with the rim or flange 12 and is preferably equal in diameter to said rim or flange. It is to be noted that the inner portion of the foraminous wall of the drum is of larger mesh than the outer portion thereof so that any unpopped corn which may pass the inner coarser mesh will drop therethrough and return to the zone of greatest heat.

The drum being rotated in the direction indicated by the arrow in Fig. 3, it will be readily seen that as the opening 16 in the periphery of the drum moves past the discharge end of the hopper 5, the corn will flow through said opening into the drum, and during the continued rotation of the drum the peripheral surface thereof will cover the outlet through the hopper and prevent further feeding of the corn. As the drum continues to rotate, the corn which has been taken up by the same will gravitate to the lowest point of the foraminous surface upon which it rests and will finally reach the point 17 whereupon the continued rotation of the drum will cause the corn to travel to and eventually into the flared discharge member 18. As the drum is perforated throughout its entire peripheral surface and the perforated element extends to the discharge member, the heat from the burner 8 can circulate through the entire drum and will, consequently, act on all the corn therein. The foraminous wall of the drum acts as a grader, the smaller inferior grains falling through the larger mesh and being retained in the drum by the outer finer mesh. If, after the popping operation is over, the drum be rotated in the direction opposite that indicated by the arrow in Fig. 3, these inferior grains will be discharged through the opening 16.

The buttering drum consists of a cylinder having an imperforate side or wall 21 and circular end plates 22 and 23, the wall 23 having a central opening defined by a sleeve 24 which projects partly into and partly from the drum and is adapted to fit snugly over and around the rim or flange 12 projecting from the popping drum so that, when the buttering drum has been placed in the proper position relative to the popping drum, a clear discharge passage will be provided so that the popped corn escaping from the popping drum will be obliged to enter the buttering drum. The central opening in the end plate 22 is somewhat larger than the central opening in the end plate 23 and in the said plate 22 concentric with the central opening is a series of perforations 25 while upon the outer side of said end plate, close to said perforations, is a ring or flange 26 of angular cross section which constitutes a drip cup to catch and retain the melted butter which may drip from the corn as it leaves the drum. Upon the inner face of the side wall 21 of the buttering drum are a series of longitudinal ribs 27 which take up the melted butter and carry it around to the upper portion of the drum so that it will drop onto the perforated cage 28 which receives the popped corn from the drum 6, as will be readily understood. The said cage 28 consists of a circular perforated sleeve having an imperforate end portion 29 adapted to fit closely upon the inner portion of the rim or flange 24 and provided at its outer end with an annular flange 30 adapted to fit against the outer face of the end plate 22. Spokes or radial arms 31 connect the ends of this cage with the ends of a hub or sleeve 32 which is adapted to fit closely upon the driving shaft 1, as clearly shown. The spokes are brazed or otherwise intimately secured to the cage and the ends of the outer spokes extend past the end of the cage to bear against the end of the drum. The outer or discharge end of this shell is somewhat larger than the inner or receiving end thereof so that the passage of the corn through the cage will be facilitated.

With the parts arranged as shown in Fig. 2, it will be readily noted that the buttering drum will be caused to rotate with the popping drum and the popped corn emerging from the popping drum will be received in the cage 28 and its final discharge retarded sufficiently to permit every grain to receive its share of butter, while the flared formation of the shell will prevent the corn accumulating in the drum and clogging the operation. The perforated cage may be readily removed from the buttering drum, inasmuch as the inner end of the cage is secured to the drum merely by the frictional engagement of the flange 29 with the rim 24 and the only rigid connection between the rim and the shell is that provided by the bolts 32' fixed in the end plate 22 and the nuts 33 mounted on the ends of said bolts and turned home against the ends of the spokes 31. By removing the nuts 33, the cage can be readily withdrawn endwise so as to permit a supply of the butter to be placed in the drum after which the cage is returned to its position within the drum and the nuts 33 restored. The cage and the drum will then rotate with the driving shaft and the popping drum and, during such rotation, the butter which will be melted by the heat from the burner 8, will be carried up by the ribs 27 and discharged upon the cage, through the perforations of which it will drip onto the corn. The corn will, of course, be agitated by the rotation of the drum and will roll toward the wider discharge end of the cage through which it will pass into any convenient receptacle provided for it. Any butter which may drip from the cage or escape from the corn will be caught by the annular drip cup 26 and will, of course, flow to the lowest point of the same and thence pass through the perforations 25 back into the drum.

My improved apparatus is exceedingly simple in the construction and arrangement of its several parts and will be found highly efficient in operation. A large quantity of corn may be treated in a very short time and all the corn will be popped and every grain buttered. If it be desired to deliver unbuttered corn, the buttering drum is merely slid endwise along the driving shaft so that it will be removed from the popping drum and the popped corn will then pass from the popping drum directly into the receptacle from which it is supplied for use. It will be readily noted that owing to the snail or spiral formation of the popping drum, the corn will be automatically taken up by said drum from the hopper and caused to roll through the same to the discharge end thereof and the quantity of corn passing through the drum will be spread over the surface of the same sufficiently to subject every grain to the heat so that there will be no unpopped kernels escaping from the drum and escape of any portion of the corn, except through the discharge opening provided therefor, is prevented.

Having thus described the invention, what is claimed as new is:

1. In an apparatus for the purpose set forth, the combination of a popping drum, a buttering drum arranged coaxially therewith and adapted to rotate therewith, the said drums being constructed at their adjacent sides with concentric rims adapted to frictionally engage whereby to hold the drums together and direct material from the popping drum into the buttering drum.

2. In an apparatus for the purpose set forth, the combination of a popping drum, a buttering drum arranged to receive material from the popping drum, and a foraminous cage arranged concentrically within the buttering drum to support material being treated.

3. In an apparatus for the purpose set forth, the combination of a popping drum, and a buttering drum arranged to receive material from the popping drum and comprising a central foraminous cage having open ends, and a cylinder fitting around the said cage and provided interiorly with means for delivering material to the cage.

4. In an apparatus for the purpose set forth, the combination of a popping drum, and a buttering drum arranged to receive material therefrom and comprising a foraminous cage and a cylinder passing around the cage and having an annular series of perforations in one end, and an annular drip cup on the outer face of said end immediately adjacent said perforations.

5. In an apparatus for the purpose set forth, a driving shaft, a popping drum, a buttering drum, one of said drums being slidably mounted on the shaft but constrained to rotate therewith, and means for directing material from the popping drum into the buttering drum.

In testimony whereof I affix my signature.

EDWARD J. DAUGHERTY. [L. S.]

Copies of this patent may be obtained for five cents each, by addressing the "Commissioner of Patents. Washington, D. C."